May 13, 1952     W. W. HARRIS     2,596,551
MOTION-PICTURE SHOW TIME DISPLAY DEVICE
Filed Sept. 6, 1949     2 SHEETS—SHEET 1

W. W. Harris
INVENTOR

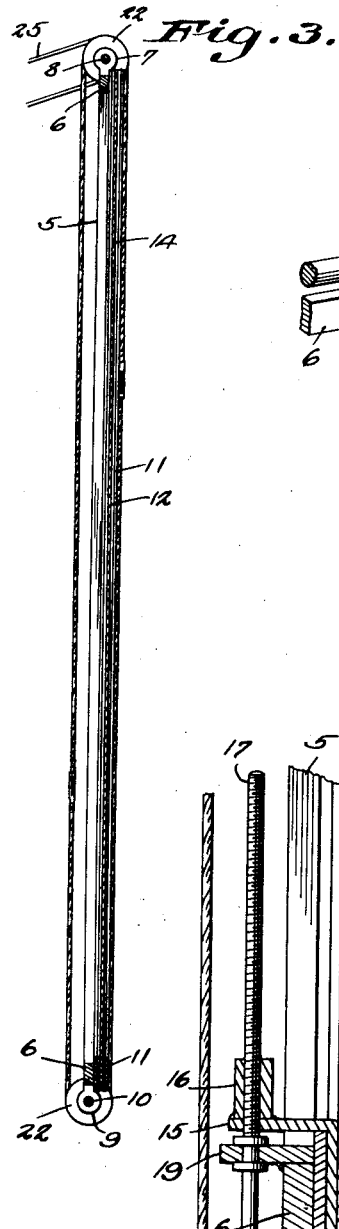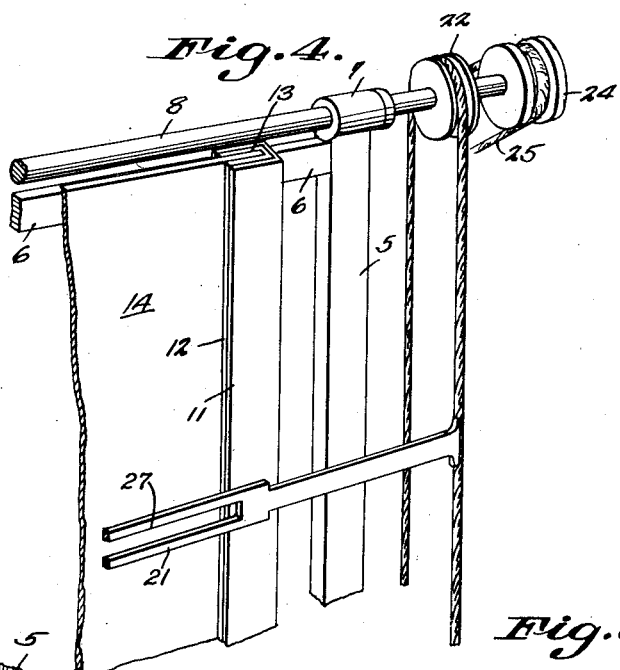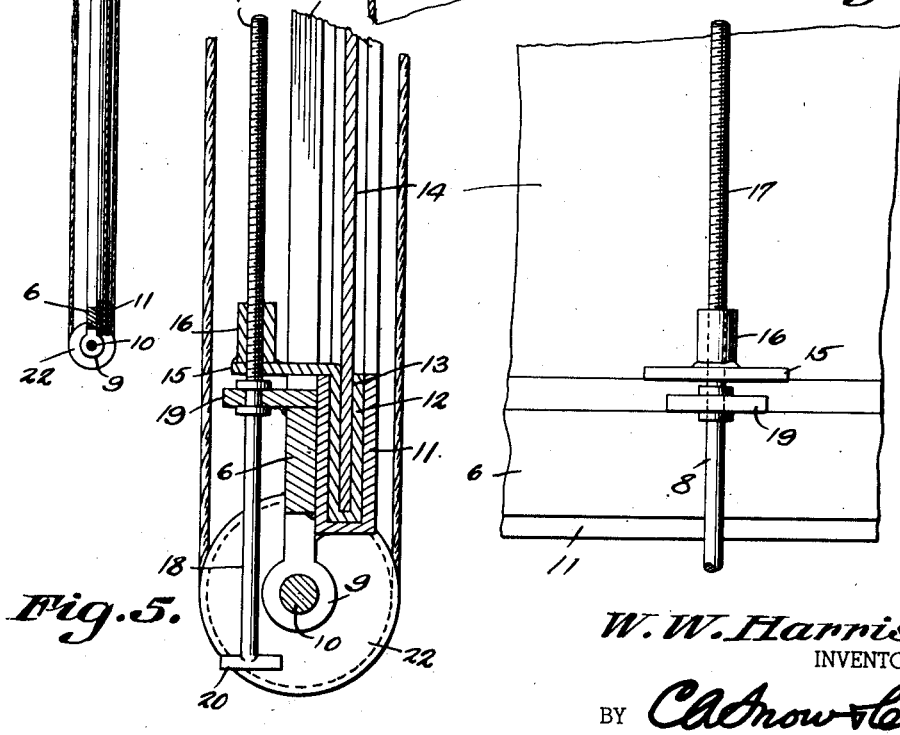

Patented May 13, 1952

2,596,551

UNITED STATES PATENT OFFICE 2,596,551

MOTION-PICTURE SHOW TIME
DISPLAY DEVICE

Weldon W. Harris, Cisco, Tex.

Application September 6, 1949, Serial No. 114,155

2 Claims. (Cl. 161—15)

This invention relates to a display device designed for positioning in the foyer or lobby of a motion picture theater, for indicating a program of motion picture films, so that theater patrons may readily determine the time for showing a particular film, the number of minutes that a particular film has been running, and the number of minutes to wait before the showing of the next film.

An important object of the invention is to provide a movable indicating member through which the title of the film being shown, is viewed, together with indicia indicating time, the indicating member being controlled and operated by means of a clock mechanism which is so correlated with the time indicia that the indicating member will accurately indicate titles of the films and times such films are shown.

Still another object of the invention is to provide a display device of this character which may be readily and easily changed to meet the requirements for program changes, and one which may be accurately adjusted with respect to the indicating member for an accurate display of the program in the event that the first show of the program is late in starting or in the event of the clock controlling mechanism stopping.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Fig. 3 is an edge elevational view of the device.

Fig. 4 is a fragmental enlarged perspective view illustrating one end of the display device.

Fig. 5 is a vertical sectional view through the lower portion of the display device, taken on line 5—5 of Fig. 1.

Fig. 6 is a fragmental elevational view illustrating the adjusting feature of the device.

Figures 1, 2:
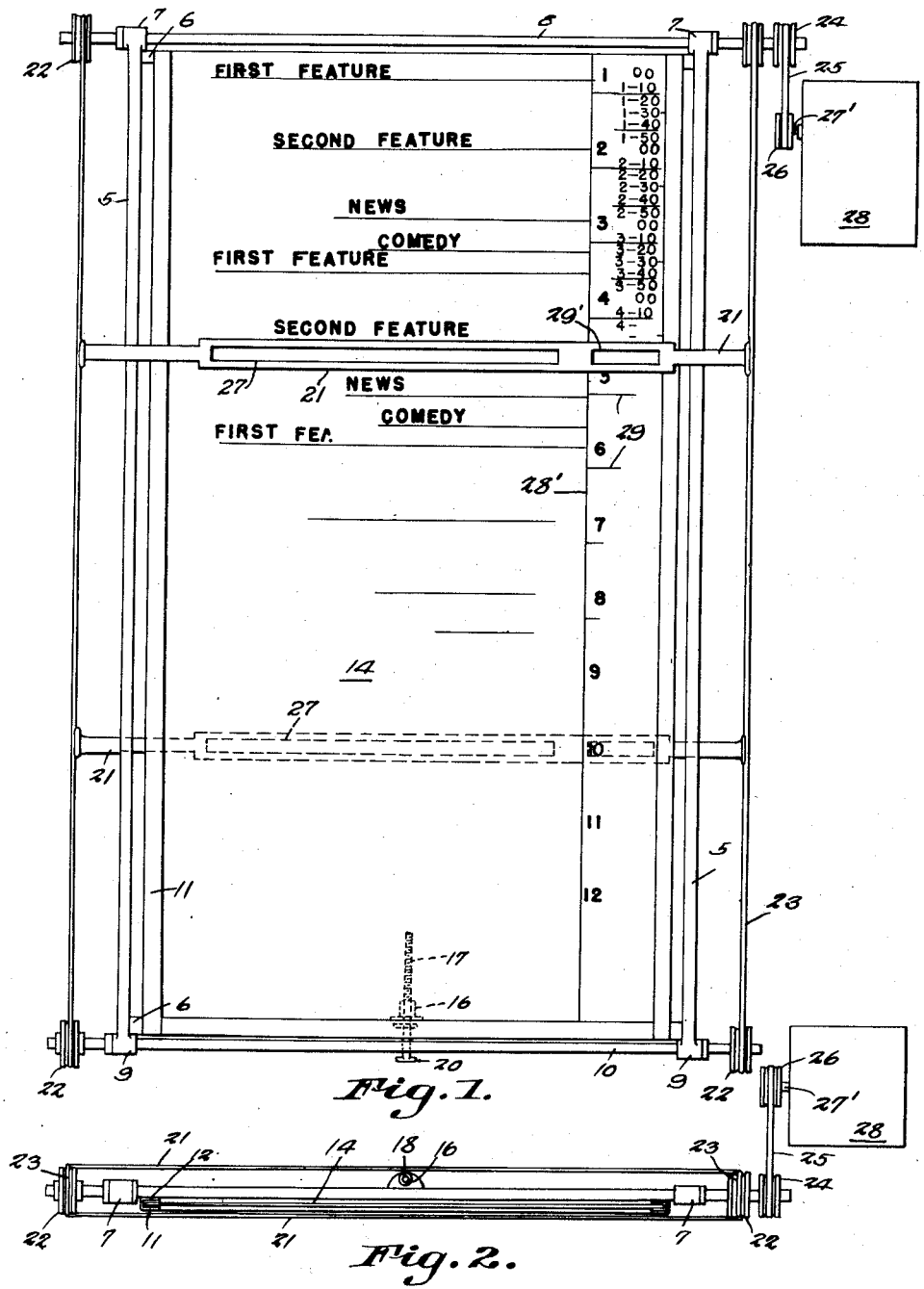
Figure 1 is a front elevational view of a display device constructed in accordance with the invention.
Fig. 2 is a plan view thereof.

Referring to the drawings in detail, the device comprises a rectangular frame including parallel vertical side bars 5 connected at their upper and lower ends by means of the transversely extended bars 6. At the upper ends of the bars 5, are bearings 7 in which the upper shaft 8 operates, while at the lower ends of the bars 5 are the tubular bearings 9, in which the lower horizontal shaft 10 operates.

Secured to the side bars 5 and lower bars 6, is an inner supporting frame 11 constructed of channel bar material, with the open sides of the frame, disposed inwardly, as clearly shown by the drawings. The upper end of the inner supporting frame 11 is open, so that the card or chart on which the titles of the pictures being shown, and times of the showing of the pictures are printed, may be readily removed and replaced with the change of the moving pictures shown at a particular theater.

The vertically adjustable U-shaped member 12 is fitted within the inner supporting frame 11 and is also constructed of channel material providing a groove 13 in which the card or chart indicated by the reference character 14 is held, the member 12 constituting a frame for the card or chart.

Forming a part of the member 12 is a rearwardly extended arm 15, which arm extends beyond the rear vertical wall of the lower bar 6, where it is provided with an internally threaded tubular member 16 through which the threaded portion 17 of the rod 18 extends, the rod 18 being mounted for rotation within an opening formed in the arm 19 that extends rearwardly from the upper edge of the lower bar 6. The reference character 20 indicates a handle formed at the lower end of the rod 18, whereby the rod may be rotated to cause the frame 11 and card or chart 14 supported therein, to move vertically, should it be desired to make a final adjustment of the card or chart with respect to the indicating bar 21, to be hereinafter more fully described.

Secured to the shafts 8 and 10, at points adjacent to the ends thereof, are pulleys 22 over which the belts 23 operate, whereby movement of one shaft is transmitted to the other shaft. The shaft 8 at the upper end of the frame, constitutes the power shaft and is also provided with the power pulley 24 over which the belt 25 operates, the belt 25 also operating over the pulley 26 mounted on the clock shaft 27' operated by means of a clock mechanism not shown, mounted in the clock housing 28.

The reference character 21, indicates indicating bars, which bars are secured to opposite flights of the endless belts 23, so that when one bar is moving over the front or forward side of the card or chart, the opposite indicating bar will be moving over the rear surface of the card or chart. These indicating bars are so arranged that when the bar moving over the forward or front surface of the card or chart passes around the bottom of the frame, the indicating bar 21 at the rear side of the frame is moving forwardly over the upper end of the frame, the indicating bars being so timed with respect to each other that the operation of the device in indicating the films to be displayed, and times for such display, will be continuous.

The card or chart which is used in the device is provided with printed matter such as indicating the first feature, second feature, news, comedy, etc., and opposite to this printed matter are indicia indicating time. The indicating bars 21 are formed with elongated openings 27 extending longitudinally thereof, the elongated openings 27 being so arranged that they will fall directly over the printed matter as it moves thereover, and since the movement of the belts 23 and bars 21 is slow, it will be seen that the printed matter can be read through the elongated openings, indicating the particular moving picture strip which is being played at a particular time.

Along one edge of the card or chart is a line 28', which line provides a vertical column with one edge of the chart, the vertical column being provided with lines 29 dividing the column into time spaces of approximately one hour each, the time spaces being divided into ten minute spaces. Each of the indicating bars is formed with an elongated opening 29' which elongated openings fall directly over the indicia indicating time, at the side edge of the card or chart.

It is to be understood that the display device may be supported by a suitable bracket not shown, the construction of the bracket being necessarily varied to meet conditions presented by the placing of the display device in a particular location.

From the foregoing it will be seen that when the device is placed in a conspicuous place in a lobby of a theater, a person may by reading the card or chart and considering the indicating bar which is moving over the face of the card or chart, as a gauge, determine when a certain film is to be displayed, the length of time a picture which is being displayed will run before it will be completed, and as a matter of fact the person will be able to determine what a patron of a moving picture theater usually desires to know before he enters the theater.

Having thus described the invention, what is claimed is:

1. An indicating device of the class described, comprising a main frame, an auxiliary chart-supporting frame mounted within the main frame and on which a time chart is mounted, means for adjusting the chart-supporting frame with respect to the main frame varying the location of markings on the chart with respect to the main frame, upper and lower horizontal shafts mounted on the main frame, the ends of said shafts extending beyond the side edges of the main frame, pulleys on the ends of the shafts, endless belts operating over the pulleys, transversely disposed indicating bars operating over the frame, said bars having elongated openings through which the time chart is read, said bars having their ends secured to the endless belts, and time controlled means for operating the shafts and belts.

2. An indicating device of the class described, comprising a main frame, an auxiliary frame mounted within the main frame in which a chart is removably secured, an internally threaded tubular member mounted on the auxiliary frame, an adjusting rod rotatably mounted on the main frame operating within the tubular member adapted to adjust the auxiliary frame vertically with respect to the main frame, endless belts operating longitudinally of the frames at the opposite side edges thereof, indicating bars having elongated sight openings, through which printed matter on the chart is viewed, said bars being connected at their ends with the belts and being movable therewith, and means for operating said belts.

WELDON W. HARRIS.

REFERENCES CITED

The following references are of record in the file of this patent:

UNITED STATES PATENTS

| Number | Name | Date |
| --- | --- | --- |
| 687,865 | South et al. | Dec. 3, 1901 |
| 1,004,097 | South | Sept. 26, 1911 |
| 2,419,394 | Erhard | Apr. 22, 1947 |
| 2,421,130 | Reid | May 27, 1947 |